United States Patent Office 3,275,583
Patented Sept. 27, 1966

3,275,583
ALKYD RESINS PREPARED FROM EPOXY ESTERS OF MONOCARBOXYLIC ACIDS AND PROCESS FOR THE PRODUCTION OF SAME
Nantko Kloos, Amsterdam, Netherlands, assignor to Shell Oil Company, New York, N.Y., a corporation of Delaware
No Drawing. Filed May 16, 1960, Ser. No. 29,165
Claims priority, application Netherlands, May 19, 1959, 239,308
6 Claims. (Cl. 260—22)

The present invention relates to a novel process for preparing alkyd resins modified with monocarboxylic resins, and more particularly the invention relates to those alkyd resins obtained by reacting esters of monocarboxylic acids containing an epoxy group in the alcoholic part of the ester or molecule with polybasic carboxylic acids or anhydrides thereof.

The above-mentioned esters are of greatly varying types both as regards the alcoholic part of the ester molecule and the monocarboxylic acid from which they are derived. However, the ester linkage represents a weak point and thus reduces its stability. Therefore, although it is possible to utilize a wide variety of fatty acids by incorporating them into the completed alkyd resin, the disadvantage of stability has been present together with the advantages of desired oil length, increased flexibility and the like. It has been found that increased stability is obtained when alpha-alkyl carboxylic acids are utilized and that particularly stable ester linkages are obtained with alpha-alpha-dialkyl carboxylic acids. Particularly desirable is the monoglycerol ester of such monocarboxylic acids and the use of such esters for preparing improved stable alkyd resins is a subject of the copending U.S. application by Bruin and Drost, Serial No. 29,164, filed May 16, 1960, now abandoned.

While the above application provides highly desirable alkyd resins of improved stability, the monoglycerol esters of secondary or tertiary carboxylic acids are difficult to obtain and the present invention provides epoxy esters which may be made into alkyd resins with the advantage of greater stability and simpler reaction processes. In other words, it is not only difficult to obtain the reaction for making monoglycidyls but it is also necessary to control the reaction whereby good yields of monoglycerols are obtained without excessive diglycerols being formed. In the present invention, where epoxy esters are utilized, there is no danger of obtaining undesirable esters, and the esterification reaction proceeds with a minimum of control.

As indicated above, the present invention provides a method of preparing a stable alkyd resin comprising reacting an epoxy ester of a monocarboxylic acid in which the carbon atom of the carboxyl group is attached to at least two other carbon atoms, with a member of the class consisting of polybasic carboxylic acids and polybasic carboxylic acid anhydrides. The present invention also provides stable alkyd compositions obtained by the above method.

The preparation of alkyd resins from epoxy alkyl esters of alkyl carboxylic acids has many advantages over other processes in which polyhydroxy compounds are used as starting materials. The reaction according to the invention is by far the most rapid and starts even at relatively low temperatures. If the starting materials are glycidyl esters and a small quantity of glycerol is also present, the alkyd formation generally begins even at approximately 130° C., and a reaction period of 1–2 hours is generally sufficient at approximately 230° C. Difficulties caused by gelling of the reaction mixture, as occur in the conventional processes, are avoided when operating according to the invention. An added advantage is that terephthalic acid may be used as polybasic acid according to the invention.

The proportions of polybasic carboxylic acid used will be related to the hydroxyl content with the epoxy ester considered as hydroxyl for this purpose, and added glycerine or the like is also included. Thus the ratio of acid to base will be such that there will be from about 1 to about 1.3 hydroxyl groups per carboxylic acid group. Stated another way, the equivalent weight of the hydroxyl or alcohol components will be from about 1 to about 1.3 times the equivalent weight of the carboxylic acid components.

The novel alkyd resins have excellent chemical and mechanical properties and are moreover light in color. They are therefore pre-eminently suitable for use as base for lacquers and varnishes. Lacquers and varnishes manufactured from these alkyd resins are highly resistant to the action of various chemicals. They are hard but at the same time flexible and give layers with good adherence which can be less readily damaged than layers manufactured from alkyd resins of different origin.

As indicated above, the chemical resistance is particularly high when epoxy esters of alpha-alpha-dialkyl monocarboxylic acids are used as starting material in the preparation. In this case the color stability is also noticeable both when exposed to light and to heat.

The epoxy esters which are preferably used in the present invention may be characterized by the following formula:

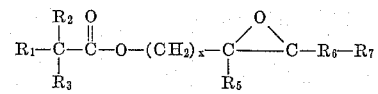

in which $R_1$ and $R_2$ are alkyl groups, $R_3$, $R_5$, $R_6$, and $R_7$ are members of the class consisting of hydrogen and alkyl groups, the groups $R_1$, $R_2$ and $R_3$ contain a sum total of from 3 to 18 carbon atoms, $R_5$, $R_6$ and $R_7$ contain a total of from 0 to 18 carbon atoms and $x$ is an integer from 0 to 6.

In general, the alcoholic parts of the ester molecule may be any one of the group fitting within the formula defined above. Most preferably, $x$ is 1 so that a 2,3-epoxy total of from 3 to 18 carbon atoms, $R]$, $R_6$ and $R_7$ con-radical is utilized such as a 2,3-epoxy butyl, 2,3-epoxy hexyl, 2,3-epoxy-4-phenyl octyl, 2-ethyl-2,3-epoxy hexyl, 2,3-epoxy-4,5-diethyl dodecyl and epoxy cyclohexyl. The nature of the carbon skeleton of the epoxy alkyl group affects the properties of the alkyd resins. Long carbon chains, for example, increase the flexibility of these resins. As will be explained further below, the most preferred component is the glycidyl esters.

The monocarboxylic acids used to make the epoxy esters are generally aliphatic monocarboxylic acids, particularly those having at least 4 and not more than 20 carbon atoms in the molecule are important. Cyclo-aliphatic or aromatic monocarboxylic acids may also be used. The important characteristic is that the acids have secondary or tertiary carboxyl groups.

Preferably these acids are obtained by reacting with carbon monoxide and water olefins having at least 3 carbon atoms in the molecule. This reaction takes place under the influence of acid catalysts, for example phosphoric acid, sulphuric acid and complexes of phosphoric acid with boron fluoride. The reaction is more thoroughly described in the copending patent application of Marinus J. Waale and Johan M. Vox, Serial No. 858,609 filed December 10, 1959, now U.S. Patent No. 3,059,004. As indicated in this patent the carboxyl group adds on at the double bond and even when the double bond is terminal, the addition is such that a strong tendency for tertiary groups to be formed by isomerization. Branching at the double bond also provides a tertiary carboxyl group. Very attractive products are obtained when mono-olefins having at least 8 and not more than 18 carbon atoms in the molecule are thus converted into mono-carboxylic acids and subsequently via the epoxy alkyl esters of these acids into alkyd resins. Preferably, more than 10% of the monocarboxylic acids will be tertiary in the carboxyl group.

The epoxy alkyl esters of the above monocarboxylic acids may be prepared in any of the known ways for obtaining epoxy esters from monocarboxylic acids. A preferred method for preparing such esters is set forth in a copending application by Nantko Kloos and Jacques J. J. Drost, Serial No. 28,865, filed May 13, 1960, now U.S. Patent No. 3,178,454.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the latter in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The alkyd resins are obtained by reacting the epoxy alkyl esters of alpha-alkyl monocarboxylic acids with polybasic carboxylic acids or anhydrides thereof. Illustrative examples of polybasic carboxylic acids include: malonic acid, succinic acid, glutaric acid, adipic acid, azeleic acid, sebacic acid, maleic acid, fumaric acid, phthalic acid, tetrahydrophthalic acid, isophthalic acid, hexahydrophthalic acid, diglycolic acid and dimerized fatty acids of drying oils such as soyabean oil. A particular advantage of the present process is that unlike alkyds made from other esters, the present method is also suitable for the production of alkyd resins from terephthalic acid. Examples of suitable dicarboxylic acid anhydrides are those of succinic acid, glutaric acid, maleic acid, phthalic acid, tetrahydrophthalic acid and hexahydrophthalic acid as well as Diels-Alder adducts of maleic anhydride with various dienes such as terpenes and cyclopentadiene.

As indicated above, the preferred alkyd resins are those made with terephthalic acid and the preferred class includes those made from a member of the class consisting of terephthalic acid, phthalic acid and phthalic anhydride.

In the preparation of the alkyd, it has also been found desirable to add a limited quantity of monocarboxylic acid which is allowed to react simultaneously in the reaction of the epoxy alkyl esters with the polybasic carboxylic acids or anhydrides thereof.

The process according to the invention may be accelerated by various catalysts. Suitable catalysts are generally Lewis bases such as hydroxy compounds including monohydric alcohols, glycols and glycerol, primary, secondary and tertiary amines, acid amides including urea and acetamide, mercaptans, dialkyl sulphides and sulphoxides; if epoxy alkyl esters are reacted with polybasic carboxylic acid anhydrides, acids may also act as catalysts. The catalyst is generally used in a quantity of 0.1 to 10% by weight, based on the whole reaction mixture.

To ensure that the alkyd resins have the lightest possible color, it is advisable to carry out the reaction of the epoxy alkyl esters with the polybasic carboxylic acids or anhydrides thereof in an oxygen-free atmosphere.

The alkyd resins of the invention are suitable to be worked up by the conventional methods to paints, lacquers and varnishes. Components such as pigments, diluents, phenol formaldehyde, urea formaldehyde and melamine resins being added to provide the desired paint.

In order to better illustrate the invention, the following specific examples are given:

*Example I*

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into monoolefins by partial hydrogenation. The alkenes were substantially unbranched. The double bonds were present almost exclusively between non-terminal carbon atoms.

The alkenes were converted with carbon monoxide and water into carboxylic acids, the temperature being 60° C, the carbon monoxide pressure 100 atmospheres, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt solution was gradually added to a ten-fold molar quantity of epichlorohydrin, the mixture being maintained at the boiling point and water removed by azeotropic distillation. In this way glysidyl esters of alpha-alkyl monocarboxylic acids having 9 to 11 carbon atoms were obtained.

An alkyd resin was then prepared by mixing the following ingredients in the proportions given:

59 grams of glycidyl esters of alpha-alkyl monocarboxylic acids having 9 to 11 carbon atoms
2.5 grams of glycerol
37 grams of phthalic anhydride.

This composition corresponds to an oil length of 49%.

The mixture was heated for 45 minutes in a nitrogen atmosphere with stirring, a temperature of 230° C. being reached. The acid number (number of mg. KOH required for neutralizing 1 gram) had already fallen to 6 after this short heating. The product had a very light color and was found to be very good quality.

*Example II*

The same mixture used for making the alkyd resin in Example I was kept instead in a nitrogen atmosphere at 230° C. with stirring. The resultant product had the following properties:

Acid number _____ 6
Viscosity of 50% solution in xylene (Gardner) ____ A3
Color of 50% solution in xylene (Gardner) _____ 1

This product was mixed with urea formaldehyde resin in a weight ratio of 70:30 and pigmented with titanium white. The mixture was applied to thin steel sheets and baked at 150° C. for 30 minutes. On testing the resultant films the following results were obtained:

Hardness: corresponding to the pencil hardness F
Flexibility: the sheets could be bent through an angle of 180° C. over a ⅛ inch mandrel
Resistance (according to ASTM standards) for 1 week at 25° C. to an aqueous solution of 5% sodium hydroxide: 9F=very good, few blisters
5% sulphuric acid: 8M=good, a moderate number of small blisters
5% acetic acid: 8D=good, many very small blisters
2% acetic acid: 9½D=very good, many extremely small blisters.

*Example III*

A mixture was prepared having the following composition:

50 grams of glysidyl esters as prepared in Example I
4.6 grams of glycerol
37 grams of phthalic acid (oil length—45%).

The mixture was heated for 2 hours at 230° C with stirring in a nitrogen atmosphere. The following data were found on the resulting product.

Acid number _____ 21
Viscosity of 50% solution in xylene (Gardner) ____ A3
Color of 50% solution in xylene (Gardner) _____ 1

The product was then mixed with urea formaldehyde resin, pigmented and baked as in Example II. On testing the resultant films the following results were obtained:

Hardness: corresponding to the pencil hardness 2H
Flexibility: the sheets could be bent through 180° over a ¼ inch mandrel
Resistance: as in Example II to:

5% sodium hydroxide: 6F=reasonable, few blisters
5% sulphuric acid: 10=not affected
5% acetic acid: 9½D=very good, many extremely small blisters
2% acetic acid: 10=not affected.

*Example IV*

A mixture was prepared having the following composition:

41.5 grams of glysidyl esters as in Example I
6.8 grams of glycerol
37 grams of phthalic anhydride (oil length—40%)

The mixture was kept at 230° C. for 2 hours with stirring in a nitrogen atmosphere and the resultant product had the following properties:

Acid number _____ 13
Viscosity of 50% solution in xylene (Gardner) ____ B
Color of 50% solution in xylene (Gardner) _____ 1

It was found impossible to prepare an alkyd resin having this oil length from glycerol, the monocarboxylic acid of which, according to the invention, the glycidyl ester was used, and phthalic anhydride.

*Example V*

Two-stage process, oil length of the alkyd resin: 55%

59 grams of gylcidyl esters as prepared in Example I mixed with 4.5 grams of the monocarboxylic acid mixture from which the esters are derived. The mixture was kept at 150° C. for half an hour and in a nitrogen atmosphere with stirring, the acid number decreasing to 0. 2.5 grams of glycerol and 35 grams of phthalic anhydride were then added and the temperature was increased to 230° C. over a 1 hour period. This temperature was maintained a further hour. The product had the following properties:

Acid number _____ 13
Viscosity of 50% solution in xylene (Gardner) ____ A4
Color of 50% solution in xylene _____ 3

*Example VI*

A mixture was prepared having the following ingredients in the proportions given:

59 grams of glycidyl esters, as in Example I
41.5 grams of terephthalic acid
(mixing ratio corresponding to oil length—49%)

The mixture was kept together at temperatures in the range of from 260° C. to 270° C. for 1½ hours in a nitrogen atmosphere with stirring. On testing the resulting product, the following results were obtained:

Acid number _____ 10
Viscosity of 50% solution in xylene (Gardner) cp __ 200
Color of 50% solution in xylene (Gardner) _____ 2

*Example VII*

A mixture was prepared having the following ingredients in the proportions given:

58.5 grams of glycidyl esters of monocarboxylic acids having from 15–19 carbon atoms but otherwise prepared as in Example I
6.9 grams of glycerol
37 grams of phthalic anhydride (oil length—49.5%)

The mixture was kept at 230° C. for 2½ hours. The product had the following properties:

Acid number _____ 10
Viscosity of 50% solution in xylene (Gardner) ____ A2
Color of 50% solution in xylene (Gardner) _____ 2

As mentioned above, the preferred resins are built-in via the glycidyl esters:

$$R_3-\underset{\underset{R_2}{|}}{\overset{\overset{R_1}{|}}{C}}-\overset{O}{\overset{||}{C}}-O-CH_2-CH\underset{O}{\overset{}{\diagdown\diagup}}CH_2$$

$R_1$, $R_2$ and $R_3$ being defined above. In comparison with the normal carboxylic acids cooked in alkyds via the fatty acid process, two significant differences exist both of which may affect the properties of the ultimate binders. These differences are:

(a) The ester of the acid utilized in the present invention contains a tertiary carboxyl group in an excess of 10% of the acid, whereas the conventional acids in alkyds contain primary carboxyl groups.
(b) The glycidyl ester gives the advantages of monoglyceride since the epoxy group functions as a diol during its further reactions.

The tertiary carboxyl groups enhance the chemical resistance properties of the binder. In a binder, based on $C_9$–$C_{11}$ acids and glycerol phthalate with an oil length of 40, the ratio of fatty acid and phthalic acid carboxyl groups is roughly 1:3. This means that in the final formulation, 25% of the carboxyl groups present is of a type difficult to saponify. Moreover, the introduction of fatty acids in glycerol phthalate via the glycidyl ester route results in a more regular distribution of these acids and minimum contents of low molecular weight products.

I claim as my invention:

1. A method of preparing a stable alkyd resin comprising reacting epoxy esters of monocarboxylic acids having the formula $$R_1-\underset{\underset{R_3}{|}}{\overset{\overset{R_2}{|}}{C}}-\overset{O}{\overset{||}{C}}-O-CH_2C\underset{H}{\overset{O}{\diagup\diagdown}}CH_2$$

in which $R_1$ and $R_2$ are alkyl groups, $R_3$ is a member of the class consisting of hydrogen and alkyl groups and the groups $R_1$, $R_2$ and $R_3$ contain a total of from 3 to 18 carbon atoms, with a member of the class consisting of phthalic acid, terephthalic acid and phthalic anhydride and wherein the equivalent weight of the epoxy ester components is from about 1 to about 1.3 times the equivalent weight of the carboxylic acid components.

2. The method defined in claim 1, in which glycerine is added to the reaction mixture.

3. The method defined in claim 1 wherein the monocarboxylic acid portion of the epoxy esters contains from 9 to 11 carbon atoms.

4. A stable alkyd resin which is the reaction product of (1) epoxy esters of monocarboxylic acids having the formula

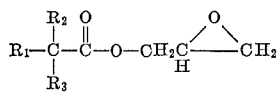

in which $R_1$ and $R_2$ are alkyl groups, $R_3$ is a member of the class consisting of hydrogen and alkyl groups and the groups $R_1$, $R_2$ and $R_3$ contain a total of from 3 to 18 carbon atoms, and (2) a member of the class consisting of phthalic acid, terephthalic acid and phthalic anhydride and wherein the equivalent weight of the epoxy ester components is from about 1 to about 1.3 times the equivalent weight of the carboxylic acid components.

5. The stable alkyd defined in claim 4, in which glycerine is reacted with the two named components.

6. A stable alkyd resin which is the reaction product of (1) epoxy esters of monocarboxylic acids having the formula

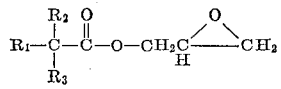

in which $R_1$, $R_2$ and $R_3$ are alkyl groups and wherein the monocarboxylic acid portion of the epoxy esters contains from 9 to 11 carbon atoms, (2) phthalic anhydride, and (3) from 0.1 to 10% by weight of the resin of glycerine and wherein the equivalent weight of epoxy ester and glycerine to phthatic anhydride is from about 1:1 to about 1.3:1.

References Cited by the Examiner
UNITED STATES PATENTS

| | | | |
|---|---|---|---|
| 2,682,514 | 6/1954 | Newey | 260—75 |
| 2,876,241 | 3/1959 | Koch et al. | 260—413 |
| 2,966,479 | 12/1960 | Fischer | 260—78.4 |

LEON J. BERCOVITZ, *Primary Examiner.*

PHILLIP E. MANGAN, MILTON STERMAN,
*Examiners.*

R. W. GRIFFIN, L. P. QUAST, T. D. KERWIN,
*Assistant Examiners.*